US010712309B2

(12) United States Patent
Paul et al.

(10) Patent No.: US 10,712,309 B2
(45) Date of Patent: Jul. 14, 2020

(54) ELECTROCHEMICAL SENSOR

(71) Applicant: Endress+Hauser Conducta GmbH+Co. KG, Gerlingen (DE)

(72) Inventors: Stefan Paul, Döbeln (DE); Jörg Uhle, Limbach-Oberfrohna (DE); Michael Hanko, Dresden (DE); Frederick J. Kohlmann, Sussex, WI (US); Aaron Osland, Neenah, WI (US)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 59 days.

(21) Appl. No.: 15/843,584

(22) Filed: Dec. 15, 2017

(65) Prior Publication Data

US 2018/0180574 A1    Jun. 28, 2018

Related U.S. Application Data

(60) Provisional application No. 62/437,719, filed on Dec. 22, 2016.

(51) Int. Cl.
*G01N 27/40* (2006.01)
*G01N 27/30* (2006.01)
*G01N 27/416* (2006.01)

(52) U.S. Cl.
CPC ....... *G01N 27/4163* (2013.01); *G01N 27/301* (2013.01); *G01N 27/40* (2013.01); *G01N 27/4167* (2013.01)

(58) Field of Classification Search
CPC ......... G01N 27/30; G01N 27/33; G01N 27/40
See application file for complete search history.

(56) References Cited

U.S. PATENT DOCUMENTS

| 6,185,989 | B1* | 2/2001 | Schulze | G01N 13/02 73/64.48 |
| 2007/0273390 | A1* | 11/2007 | Champion | G01F 23/284 324/639 |
| 2013/0161191 | A1* | 6/2013 | Wilhelm | G01N 27/301 204/406 |
| 2015/0247818 | A1* | 9/2015 | Silvester | G01N 27/4045 205/793 |
| 2016/0313169 | A1* | 10/2016 | Gorenflo | G01F 23/261 |

FOREIGN PATENT DOCUMENTS

| DE | 102008055107 A1 * | 7/2010 | ............ G01N 27/36 |
| WO | WO-2010072601 A1 * | 7/2010 | ............ G01N 27/36 |
| WO | WO-2015086225 A1 * | 6/2015 | ........... G01F 23/261 |

* cited by examiner

*Primary Examiner* — Luan V Van
*Assistant Examiner* — Caitlyn Mingyun Sun
(74) *Attorney, Agent, or Firm* — Christopher R. Powers; Endress+Hauser (USA) Holding Inc.

(57) ABSTRACT

The present application relates to an electrochemical reference half-cell, in particular, for an electrochemical sensor for measuring a measurand of a medium surrounding the sensor, including a housing with a chamber that is filled with a reference electrolyte and compressed air, wherein the reference electrolyte is in electrolytic contact with a medium surrounding the chamber across a junction in particular, a diaphragm arranged in a wall of the chamber, and a pickup electrode in particular, comprising an electric conductor immersed in the reference electrolyte, wherein the reference half-cell has a measuring device capable of generating an electrical signal that can be traced back to the pressure in the chamber.

17 Claims, 1 Drawing Sheet

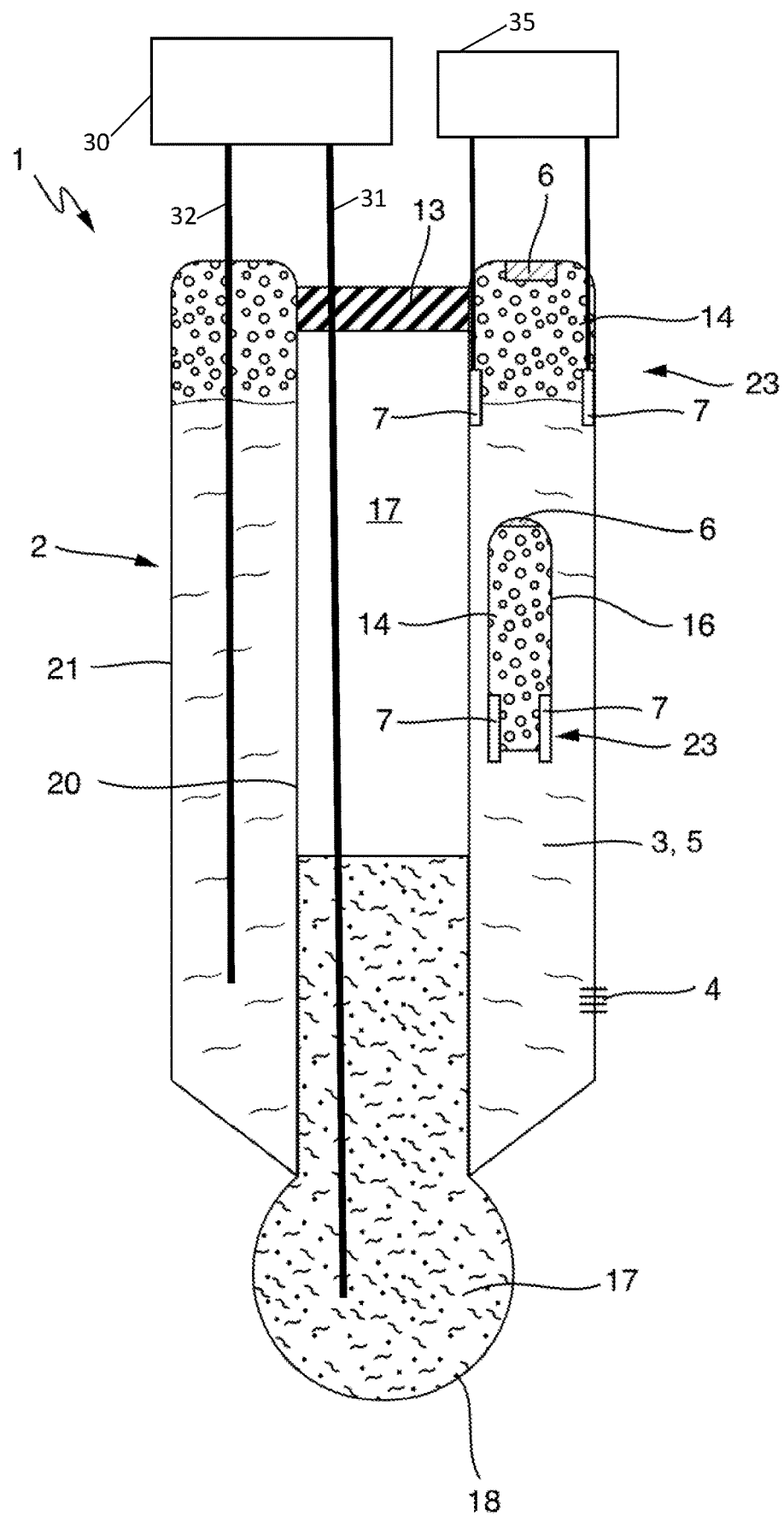

ELECTROCHEMICAL SENSOR

CROSS-REFERENCE TO RELATED APPLICATION

The present application is related to and claims the priority benefit of U.S. Provisional Patent Application No. 62/437,719, filed on Dec. 22, 2016, the entire contents of which are incorporated herein by reference.

TECHNICAL FIELD

The present application relates to an electrochemical sensor for measuring a measurand of a medium surrounding the sensor.

BACKGROUND pH glass electrodes exist which are subjected to pressure during the production process in the reference and/or bridge electrolyte chamber. This method is used to prevent a continuous discharge of reference and/or bridge electrolyte, and contamination of the electrode of measuring medium, during use.

During the production process, these electrodes are stored in a pressure tank at a pressure of, for example, 10 bar. An elevated inner electrode pressure accumulates after a time via the porous diaphragm of the electrode. After a certain time, the sensors are removed from the pressure tank, and the inner electrode pressure is checked. The fill-level of the set pressure is frequently evaluated using an air bubble that is a few millimeters in size. This air bubble is embedded in the sensor by design. If a nominal pressure of, for example, 4 bar is not reached, the electrode is again stored in the pressure tank under an overpressure for a specific period.

Since the pressure setting differs from sensor to sensor, there is no specific number of storage cycles in the pressure tank. Continuously monitoring the inner electrode pressure and the associated quality of the measurement is impossible given the current state of the art.

During production and in industrial use, the actual amount of the pressure in the electrode cannot be precisely determined. Normally, this is assessed on the basis of the size of the air bubble in the interior of the electrode. In the process, electrodes may be subject to insufficient or excessive pressure. When using the electrode, a reduction in pressure occurs from the bridge and/or reference electrolyte being pressed out through the diaphragm. The rate of pressure reduction depends upon numerous factors, such as the temperature, process pressure, and porosity of the diaphragm. If the process pressure exceeds the inner pressure of the electrolyte, the reference electrolyte becomes contaminated; frequently, this can be detected only by a drift in the measured values.

SUMMARY

The aim of the present application is to provide a reference half-cell that provides stable measured values over the long-term.

The aim is achieved by the subject matter of the present application. The subject matter of the present application is a reference half-cell in particular, for an electrochemical sensor for measuring a measurand of a medium surrounding the sensor comprising a housing with a chamber that is filled with a reference electrolyte and compressed air, wherein the reference electrolyte is in electrolytic contact with a medium surrounding the chamber via a junction in particular, a diaphragm arranged in a wall of the chamber, a pickup electrode in particular, comprising an electric conductor immersed in the reference electrolyte, characterized in that the reference half-cell has a measuring device which is capable of generating an electrical signal that can be traced back to the pressure in the chamber.

With sensors that have installed electronics, another measuring channel, in addition to the existing measuring channels for, for example, pH value and temperature, can be used that cyclically or continuously detects the inner pressure of the electrode. The electronics are measuring electronics present in the plug-in sensor head, in which a detection of raw measured values of pressure is also integrated. A component can be used for this which measures the inner electrode pressure. Such miniaturized pressure sensors are, for example, also used to detect the inner pressure of automobile tires.

According to an embodiment, the measuring device is a pressure sensor that is arranged in the chamber such that the pressure sensor borders the air in the chamber.

According to an embodiment, the measuring device is a fill-level sensor for determining the fill-level of the electrolyte in the chamber.

According to an embodiment, a capillary downwardly opened and filled with air and reference electrolyte is arranged within the part of the chamber filled with reference electrolyte, wherein the measuring device is a fill-level sensor for determining the fill-level of the electrolyte in the capillaries.

According to a further development, the fill-level sensor is designed such that the fill-level sensor determines the fill-level of the electrolyte by means of an impedance measurement in particular, capacitance measurement, inductance measurement, or resistance measurement.

According to a further embodiment, the fill-level sensor comprises two electrodes that are arranged such that the fill-level of the electrolyte relative to the air is arranged between the electrodes, wherein the sensor is designed such that a change in pressure in the chamber causes a change in the fill-level of the electrolyte in the chamber.

The two electrodes are arranged on the inside of the chamber. The electrodes form a capacitor whose capacitance depends upon the size of the bubble, and thus upon the pressure within the chamber. When the pressure is low, for the most part, only air would be located between the electrodes. Depending upon the electrolyte conductivity, the corresponding capacitance value could be determined for this state, which represents the non-pressurized state.

The chamber is subjected to pressure during the production of the sensor. If more of the reference electrolyte is pressed into the chamber during pressurization, the air volume in the chamber decreases, and the fill-level of the reference electrolyte rises. If, in contrast, air is pressed into the chamber during pressurization, the air volume in the chamber remains nearly the same. It is advantageous to affix the electrodes at an opening of the capillaries. In such a capillary, the air volume correlates with the predominating pressure. The resulting capacitance value is therefore an indication of the pressure in the chamber.

According to an embodiment, an electronics unit is provided that supplies a first electrical alternating signal to the two electrodes, wherein the two electrodes generate a second electrical alternating signal as a reaction to the first alternating signal, wherein the electronics unit is designed such that the electronics unit determines the impedance between the two electrodes due to the first and second alternating signals, and infers the pressure in the chamber from the impedance.

According to a further embodiment, the electronics unit is designed such that the electronics unit generates a warning signal once the pressure in the chamber is below a minimum pressure or above a maximum pressure.

According to an embodiment, the electronics unit is designed such that the electronics unit generates a warning signal that indicates the ingress of medium into the chamber once the pressure in the chamber rises.

The aim of the present application is also achieved with an electrochemical sensor comprising a reference half-cell according to the present application.

BRIEF DESCRIPTION OF THE DRAWINGS

The present application is explained in more detail based upon the following drawing. Illustrated is:

FIG. 1 shows a longitudinal section of an electrochemical sensor designed as a single-rod measuring chain.

DETAILED DESCRIPTION

FIG. 1 shows a longitudinal section of an electrochemical sensor 1 designed as a single-rod measuring chain. The sensor 1 possesses an electrically insulating housing 2, for example, of glass that has, as a first housing part, an electrically insulating inner tube 20, which is terminated at one end by a pH-sensitive glass membrane 18 and, at another end, by a closure 13. The inner tube of 20 is surrounded by a second housing part designed as an electrically insulating shaft tube 21. In this manner, an electrically insulated annular chamber 3 is formed that runs around the inner tube 20 and is separated, so as to be completely liquid-tight, from the inner housing chamber of the inner tube 20.

The inner housing chamber enclosed by the glass membrane 18 and the inner tube 20 is filled with an inner electrolyte 17 with a known pH value in which a first pickup electrode 31 is immersed that, for example, is made of a chlorided silver wire. The thus-formed measuring half-cell of the sensor 1 is connected in an electrically conductive manner to measuring electronics 30 by a contact point connected in an electrically conductive manner to the first pickup electrode 31. The chamber 3 formed between the inner tube 20 and the shaft tube 21 is filled with a reference electrolyte 5 such as a 3-molar aqueous potassium chloride solution. A second pickup electrode 32 is immersed in the reference electrolyte 5 and, like the first pickup electrode 31, is designed as a silver wire coated with silver chloride. A junction 4, such as a diaphragm, is provided on the shaft tube 21, which junction 4 enables an exchange of charge carriers between the chamber 3 and the surroundings, e.g., a medium, in which the sensor 1 is immersed for performing measurements. The thus-formed reference half-cell of the electrochemical sensor 1 is connected to the measuring electronics 30 in an electrically conductive manner via a contact point connected to the second pickup electrode 32. The measuring electronics 30 comprise means for determining the difference in potential between the potential of the measuring half-cell that can be tapped at the first pickup electrode 31, and the potential of the reference half-cell that can be tapped at the second reference electrode. The measuring electronics 30 can, for example, be accommodated at least partially in a plug head (not shown) attached to an electrochemical sensor 1, or in a measuring transducer (not shown) to which the electrochemical sensor 1 can be connected electrically and/or for exchanging information.

To perform measurements, the sensor 1 is immersed in a medium (not shown) whose pH value is to be determined and that is also designated as the measuring medium, so that at least the glass membrane 18 and the junction 4 are in contact with the medium. The pH sensor immersed in the medium forms, with the medium, a galvanic cell whose cell voltage depends upon the hydrogen ion concentration or the pH value of the medium. The glass membrane 18 represents the part of the pH sensor that is sensitive to the hydrogen ions. The measuring half-cell forms a first galvanic half-element that is in electrical contact, via the glass membrane 18, with the measuring medium, whereas the reference half-cell forms a second galvanic half-element that is in contact, via the junction 4, with the medium. The difference in potential detected at the terminal connections and the two potential sensing elements is accordingly a measure of the pH value of the medium.

Moreover, the reference half-cell has a pressure sensor 6 as a measuring device. The pressure sensor 6 is located in an upper part, filled with air 14, of the chamber 3. In this manner, the pressure sensor 6 is able to measure the air pressure in the chamber 3. The pressure sensor 6 is able to generate an electrical in particular, digital signal that indicates the pressure in the part of the chamber 3 filled with air 14.

To measure the fill-level or pressure in the chamber 3, an electronics unit 35 supplies the two electrodes 7 with a first electrical alternating signal. In reaction to the first alternating signal, the electrodes 7 generate a second electrical alternating signal. Due to the first and second alternating signals, the electronics unit 35 is able to determine the impedance between the two electrodes 7 and infer the pressure in the chamber 3 from the impedance.

An alternative measuring device is also shown in FIG. 1, in the form of a fill-level meter 23. The fill-level meter 23 comprises two electrodes 7 that are arranged in the chamber 3 such that their capacitance changes with the fill-level of the reference electrolyte. Of course, any fill-level meters that are routinely used in practice are also possible for measuring the fill-level in the reference electrolyte. The electrodes 7 are able to generate an electrical signal, from which the fill-level of the reference electrolyte 5 in the chamber 3 can be derived. The pressure in the chamber 3 can be inferred from the fill-level of the reference electrolyte 5 in the chamber 3. The lower the fill-level of the reference electrolyte 5 in the chamber 3, the higher the pressure in the chamber 3, and vice versa. If the fill-level is insufficient, a warning signal and/or a message to service the sensor is output to the user.

A third alternative for determining the pressure in the chamber 3 is a capillary 16 within the part of the chamber 3 filled with reference electrolyte. The capillary 16 is open at the bottom, and also consists of glass and is filled with compressed air 14 and reference electrolyte. If the sensor 1 is built in, the sensor 1 has an orientation as in FIG. 1. With such an orientation, a fill-level of the reference electrolyte 5 formed in the capillaries 16 as a boundary layer of reference electrolyte 5 and air 14.

The pressure in the capillaries 16 is measured analogously to the measuring devices in the chamber 3. The measuring device can be a pressure sensor 6 in the air-filled part of the capillaries 16 that measures the pressure in the air-filled part of the capillaries 16. The measuring device can also be a fill-level sensor that capacitively measures the fill-level of the reference electrolyte 5 in the capillaries 16, and infers the pressure from the fill-level.

In an advantageous embodiment, an evaluating unit is accommodated in the plug head of the electrode. The plug head is connected to the evaluating units by a cable, or wirelessly by means of a measuring transducer or another higher-level unit. The measuring transducer sends the warning signals to the evaluating unit. Alternatively, an LED can be arranged directly on the plug head that flashes once the pressure in the chamber is too high. This necessitates an energy source, such as a battery or a capacitor in the plug head. The energy source is also helpful during production while pressurizing, since the electrodes already in the chamber (where they are not connected to a measuring transducer) are then able to emit the warning signals.

The invention claimed is:

1. A reference half-cell for an electrochemical sensor for measuring a measurand of a medium surrounding the sensor, the reference half-cell comprising:
 a housing defining a chamber, the chamber filled with a reference electrolyte and compressed air, wherein the reference electrolyte is in electrolytic contact with a medium surrounding the chamber via a junction disposed in a wall of the chamber;
 a pickup electrode including an electrical conductor immersed in the reference electrolyte; and
 a measuring device disposed in the chamber and configured to generate an electrical signal from which a pressure of the reference electrolyte in the chamber is determined.

2. The reference half-cell of claim 1, wherein the junction is a diaphragm.

3. The reference half-cell of claim 1, wherein the measuring device is a pressure sensor disposed in the chamber such that the pressure sensor spans an interface between the reference electrolyte and the air in the chamber.

4. The reference half-cell of claim 1, wherein the measuring device is a fill-level sensor configured to determine a fill-level of the reference electrolyte in the chamber.

5. The reference half-cell of claim 1, wherein a capillary, downwardly open on a first end and closed on a second end and filled with compressed air and reference electrolyte such that the compressed air is disposed at the closed end, is arranged within a part of the chamber filled with reference electrolyte such that the capillary is surrounded by the reference electrolyte, and wherein the measuring device is a fill-level sensor disposed in the capillary and configured to determine a fill-level of the reference electrolyte in the capillary.

6. The reference half-cell of claim 4, wherein the fill-level sensor is embodied such that the fill-level sensor determines the fill-level of the reference electrolyte using an impedance measurement.

7. The reference half-cell of claim 6, wherein the impedance measurement is a capacitance measurement, an inductance measurement or a resistance measurement.

8. The reference half-cell of claim 4, wherein the fill-level sensor includes two electrodes arranged such that an interface between the reference electrolyte and the air is arranged between the electrodes, and wherein the sensor is configured such that a change in pressure in the chamber causes a change in the fill-level of the reference electrolyte in the chamber.

9. The reference half-cell of claim 8, further comprising an electronics unit configured to supply a first electrical alternating signal to the two electrodes, wherein the two electrodes generate a second electrical alternating signal in reaction to the first alternating signal, and wherein the electronics unit is further configured to determine the impedance between the two electrodes from the first and second alternating signals and to determine the pressure in the chamber from the impedance.

10. The reference half-cell of claim 9, wherein the electronics unit generates a warning signal when the pressure in the chamber is below a minimum pressure or above a maximum pressure.

11. The reference half-cell of claim 9, wherein the electronics unit generates a warning signal indicating ingress of the medium into the chamber when the pressure in the chamber rises.

12. An electrochemical sensor comprising a reference half-cell, the reference half-cell including:
 a housing defining a chamber, the chamber filled with a reference electrolyte and compressed air, wherein the reference electrolyte is in electrolytic contact with a medium surrounding the chamber via a junction disposed in a wall of the chamber;
 a pickup electrode including an electrical conductor immersed in the reference electrolyte; and
 a measuring device disposed in the chamber and configured to generate an electrical signal from which a pressure of the reference electrolyte in the chamber is determined.

13. The electrochemical sensor of claim 12, wherein the electrochemical sensor is a pH sensor.

14. The electrochemical sensor of claim 12, wherein the junction is a diaphragm.

15. The electrochemical sensor of claim 12, wherein the measuring device is a pressure sensor disposed in the chamber such that the pressure sensor spans an interface between the reference electrolyte and the air in the chamber.

16. The electrochemical sensor of claim 12, wherein the measuring device is a fill-level sensor configured to determine a fill-level of the reference electrolyte in the chamber.

17. The electrochemical sensor of claim 12, wherein a capillary, downwardly open and filled with compressed air and reference electrolyte, is arranged within a part of the chamber filled with reference electrolyte, and wherein the measuring device is a fill-level sensor for determining the fill-level of the reference electrolyte in the capillary.

* * * * *